MANUFACTURE OF SEMICONDUCTOR DEVICES

Filed Aug. 17, 1955 2 Sheets-Sheet 1

INVENTORS
RALPH DAVID KNOTT
MICHAEL RUPERT PLATTEN YOUNG
BY
ATTORNEY

INVENTORS
RALPH DAVID KNOTT
MICHAEL RUPERT PLATTEN YOUNG
BY [signature]
ATTORNEY

United States Patent Office 2,898,668

Patented Aug. 11, 1959

2,898,668

MANUFACTURE OF SEMICONDUCTOR DEVICES

Ralph David Knott, North Greenford, and Michael Rupert Platten Young, Wembley, England, assignors to The General Electric Company Limited, London, England Application August 17, 1955, Serial No. 528,963

Claims priority, application Great Britain August 23, 1954

6 Claims. (Cl. 29—25.3)

This invention relates to the manufacture of semiconductor devices.

The invention is concerned in particular with semiconductor devices of the kind comprising an electrode formed by fusing on the surface of a semiconductor body a quantity of a material consisting of or containing a donor or acceptor impurity, and then cooling the material so as to form a bead at the base of which is a layer of the semiconductor containing said impurity. In this specification such an electrode will be referred to as a bead electrode.

In such semiconductor devices it is usually necessary to provide a conducting lead secured to the bead. One method by which this has been done is soldering a wire to the bead by melting part of the bead, but with this method there is a risk that too much of the bead will be melted so that the layer of the semiconductor at the base of the bead will be short-circuited.

It is an object of the present invention to provide a method of manufacturing a semiconductor device comprising a bead electrode, in which this risk is eliminated.

According to the invention, in a method of manufacturing a semiconductor device comprising a bead electrode, the material which is to form the bead is moulded around the end of a lead wire before being brought into contact with the semiconductor.

Preferably the material is moulded in the solid state around the end of the lead wire.

Figure 1:
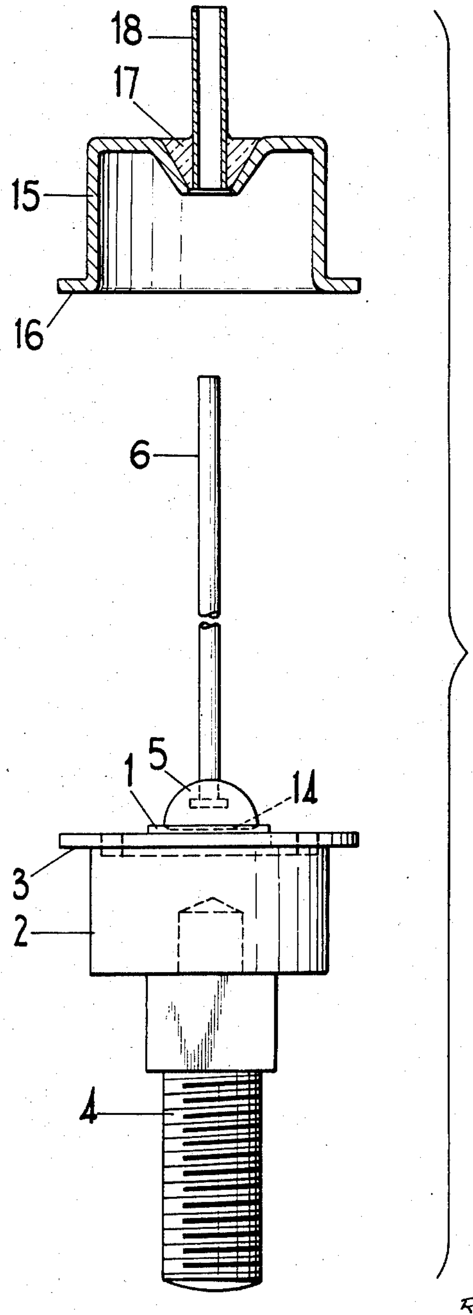
Figure 2:
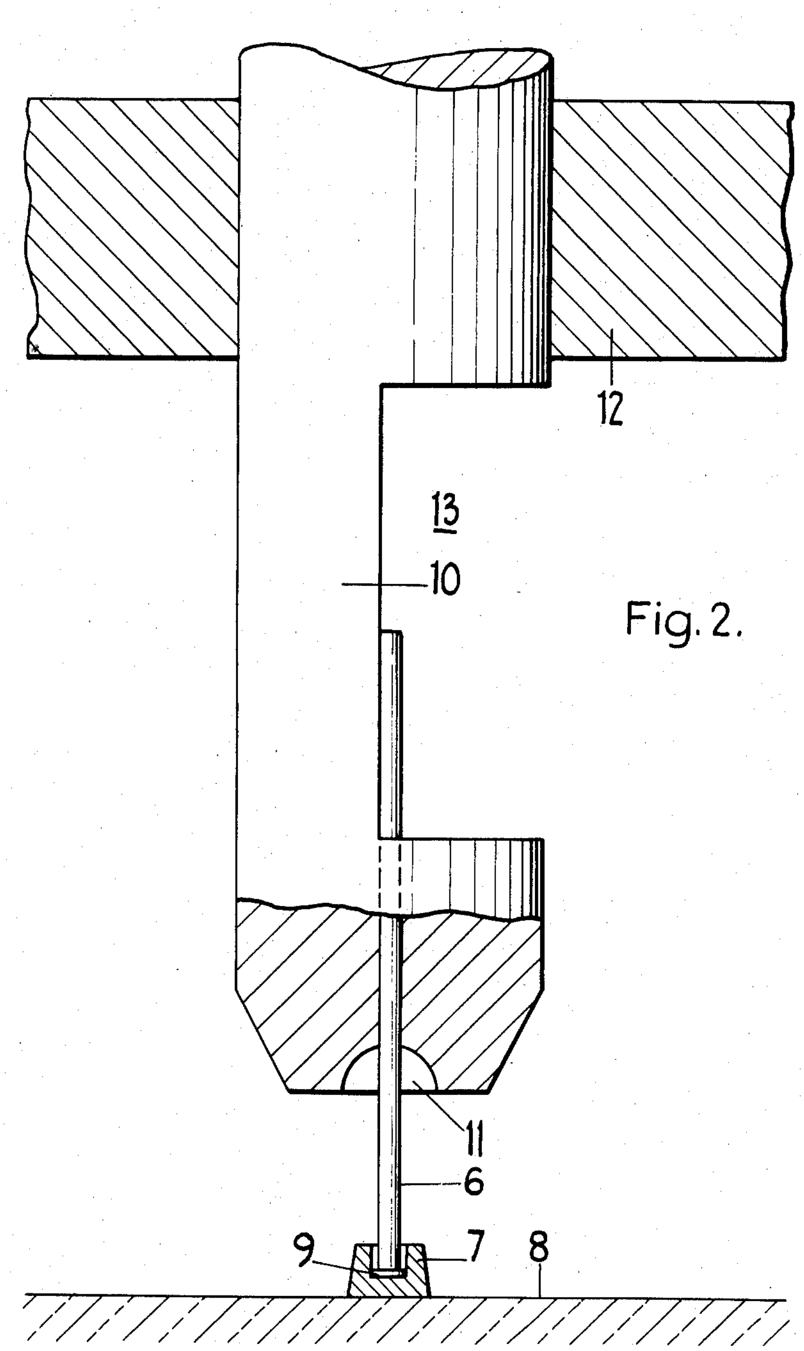

One arrangement in accordance with the invention will now be described by way of example with reference to the accompanying drawings, in which:

Figure 1 is an elevation, partly in section, of parts of a P–N junction rectifier just before the final assembly of the rectifier; and Figure 2 illustrates a stage in the manufacture of the rectifier shown in Figure 1.

Referring to Figure 1 of the drawings, the rectifier is manufactured from a plate 1 of N-type germanium having a resistivity of about 10 ohm centimetres, the plate 1 having a thickness of about 0.4 millimetre and having main faces about 6 millimetres square. One main face of the plate 1 is soldered to a cylindrical copper block 2 which is provided with a peripheral flange 3, a threaded fixing stud 4 being soldered to the other end of the block 2. The other main face of the plate 1 is provided with a bead electrode 5 formed from indium in which is embedded the end of a nickel lead wire 6.

Before the formation of the bead electrode 5, the material from which it is to be formed is prepared as follows. A quantity of about 100 milligrams of pure indium is placed in a stainless steel die and is moulded by pressure from a punch into the shape of a truncated cone having an axial cylindrical hole extending partially through it from the smaller plane face of the cone; the truncated cone has plane faces of diameters 3.5 and 4 millimetres respectively and has a height of 2.4 millimetres, the axial hole having a diameter of 1.85 millimetres and a length of 1.5 millimetres.

Referring now to Figure 2 of the drawings, the indium cone 7 is placed on a plate glass die plate 8 and the end of the nickel lead wire 6 is inserted in the hole in the cone 7, the wire 6 having a diameter of 1 millimetre and being provided at this end with a flange 9 having an external diameter of 1.75 millimetres and a thickness of 0.25 millimetre. The wire 6 is of commercially pure nickel and is initially thoroughly cleaned by furnacing at first in dry hydrogen for ten minutes at a temperature of 1000° C. and then in vacuo for ten minutes at the same temperature. The wire 6 is also threaded through an axial hole in a vertically extending stainless steel punch 10, which has a plane end surface in which is formed a central hemispherical cavity 11 of 4.5 millimetres diameter. The punch 10 slides in a hole in a horizontal supporting bar 12, and after the cone 7 and wire 6 have been placed in position the punch 10 is subjected to a downward impulse to mould the indium cone 7 into the form of a hemisphere around the end of the wire 6. The flange 9 ensures that the wire 6 is firmly embedded in the indium hemisphere thus produced, while the initial shape of the cone 7 is chosen so that the flow of indium during the moulding operation is such that there is no tendency for the wire 6 to rise or for air to be trapped around the wire 6. In order to enable the wire 6 and the moulded indium hemisphere to be removed from the punch 10 without handling the indium hemisphere, the punch 10 is cut away at 13 so that the wire 6 may be pushed out from the end remote from the indium hemisphere.

The volume of indium used to produce the hemisphere is such that an irregular flash is formed around the base of the hemisphere during the moulding operation, and before the wire 6 and indium hemisphere are removed from the punch 10 this flash is cut off with a sharp blade so as to form a fresh surface at the base of the hemisphere. This fresh surface is bonded to one main face of the germanium plate 1 which has been freshly etched, by pressing the two surfaces together.

The soldering of the germanium plate 1 to the copper block 2 and the formation of the bead electrode 5 are then carried out as follows. The copper block 2 is mounted in a jig (not shown) with the end to which the germanium plate 1 is to be soldered disposed uppermost; on this end of the copper block 2 is laid a thin disc of soft solder (not shown) and the nickel wire 6 is held by the jig so that the lower main face of the germanium plate 1 rests on the upper face of the disc of solder. The whole assembly is heated to a temperature of about 550° C. in an atmosphere of dry hydrogen, and is then allowed to cool. By this means the lower face of the germanium plate 1 is soldered to the copper block 2, while the indium hemisphere is fused to the upper face of the germanium plate so as to form a bead 5 at the base of which a P–N junction 14 separating the main body of N-type germanium from a layer of P-type germanium formed by recrystallisation from the indium-germanium alloy produced during the heating. The wire 6 is held sufficiently tightly in the jig to prevent it sinking through the molten indium during the heating operation and thereby coming into contact with the germanium. The thorough initial cleaning of the wire 6 and the method of moulding the indium hemisphere described above minimise difficulties which might arise due to the evolution of gas bubbles in the molten material during the heating; furthermore, the use of a hemispherical shape for the indium moulded around the end of the wire 6, which corresponds to the equilibrium molten shape of the bead 5, minimises difficulties which might arise due to flowing out or contraction of the material on melting. In order to ensure consistently good results in the formation of the P–N junction 14, it has been found desirable when using an indium bead of the dimensions described above that the spacing between the end of the wire 6 and the original main face of the germanium plate 1 should not be much less than 1 millimetre.

Referring again to Figure 1 of the drawings, the envelope of the rectifier is then completed by disposing over the end of the copper block 2 a copper cap 15 having a peripheral flange 16, the cap 15 having sealed through it a glass bead 17 through which is sealed a nickel tube 18 through which the lead wire 6 passes. The envelope is sealed by cold pressure welding the flanges 3 and 16 together, and then cold pressure welding the tube 18 to the wire 6, the cold welding operations being carried out in an inert atmosphere such as nitrogen so as to provide a permanent inert gas filling for the envelope of the completed rectifier.

In the arrangement described above, the lead wire 6 was of nickel. For some applications, particularly where the rectifier is to have a high current capacity, the electrical resistivity of nickel may be unduly high. In such cases we have found that a satisfactory alternative material for the lead wire is nickel plated copper; copper itself is not satisfactory since it forms an alloy with indium having a melting point less than 550° C., in which germanium is more soluble than in pure indium.

As an alternative to moulding the material which is to form the bead in the solid state around the end of the lead wire, it is possible in accordance with the invention to cast the material around the end of the wire. This alternative is in general considered less satisfactory, however, since it requires an extra furnacing operation in the manufacture of the device, which may introduce some risk of contamination of the material which is to form the bead.

In addition to eliminating the risk referred to above of short-circuiting the layer of the semiconductor at the base of the bead during manufacture, the method according to the invention allows of accurate control of the size and surface area of the bead electrode and allows the material which is to form the bead to be manipulated conveniently without appreciable risk of contamination. A further advantage of the method according to the invention is that it contributes to the possibility of eliminating the necessity for the etching process which is normally required after formation of a bead electrode.

It will be appreciated that while the invention is of particular utility where the bead is formed from indium, it is equally applicable where other materials are used. In some such cases where it is desired to mould the material which is to form the bead in the solid state, it may be necessary to heat the material to some extent in order to render it sufficiently malleable for satisfactory moulding.

We claim:

1. A method of manufacturing a semiconductor device comprising a bead electrode, in which the material which is to form the bead is moulded around the end of a lead wire before being brought into contact with the semiconductor.

2. A method according to claim 1, in which the material is moulded in the solid state around the end of the lead wire.

3. A method according to claim 1, in which the material is moulded in the form of a hemisphere the base of which is brought into contact with the semiconductor.

4. A method according to claim 3, in which the hemisphere is moulded from a truncated cone having a height slightly greater than the radius of the hemisphere and a base of substantially the same radius as the hemisphere, the cone having an axial hole extending partially through it from its smaller plane face to receive the end of the lead wire.

5. A method according to claim 1, in which the end of the lead wire around which the material is moulded is provided with a flange.

6. A method of manufacturing a semiconductor device comprising an indium bead electrode, in which the indium which is to form the bead is moulded around the end of a lead wire before being brought into contact with the semiconductor, at least the surface of the lead wire being of nickel which has been thoroughly cleaned.

References Cited in the file of this patent

UNITED STATES PATENTS

| | | |
|---|---|---|
| 2,733,390 | Scanlon | Jan. 31, 1956 |
| 2,735,919 | Shower | Feb. 21, 1956 |